(12) United States Patent
Oostveen et al.

(10) Patent No.: US 8,051,290 B2
(45) Date of Patent: Nov. 1, 2011

(54) INCREASING INTEGRITY OF WATERMARKS USING ROBUST FEATURES

(75) Inventors: Job Cornelis Oostveen, Eindhoven (NL); Antonius Adrianus Cornelis Maria Kalker, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1708 days.

(21) Appl. No.: 10/498,962

(22) PCT Filed: Dec. 9, 2002

(86) PCT No.: PCT/IB02/05322
§ 371 (c)(1),
(2), (4) Date: Jun. 16, 2004

(87) PCT Pub. No.: WO03/054799
PCT Pub. Date: Jul. 3, 2003

(65) Prior Publication Data
US 2005/0044370 A1 Feb. 24, 2005

(30) Foreign Application Priority Data
Dec. 21, 2001 (EP) .................................. 01205142

(51) Int. Cl.
*H04L 9/32* (2006.01)
(52) U.S. Cl. ........................................ 713/176; 382/100
(58) Field of Classification Search .................... 713/176
See application file for complete search history.

(56) References Cited

U.S. PATENT DOCUMENTS

| | | | | |
|---|---|---|---|---|
| 5,960,081 A * | 9/1999 | Vynne et al. | ................. | 713/176 |
| 5,974,548 A * | 10/1999 | Adams | ......................... | 713/186 |
| 6,031,914 A * | 2/2000 | Tewfik et al. | ................. | 380/54 |
| 6,556,689 B1 * | 4/2003 | Xia et al. | ...................... | 382/100 |
| 6,792,129 B1 * | 9/2004 | Zeng et al. | ...................... | 382/100 |
| 7,164,778 B1 * | 1/2007 | Nakamura et al. | ............ | 382/100 |
| 2002/0009208 A1 * | 1/2002 | Alattar et al. | ................. | 382/100 |
| 2007/0140523 A1 * | 6/2007 | Parisis et al. | .................. | 382/100 |

FOREIGN PATENT DOCUMENTS

| | | |
|---|---|---|
| EP | 0953938 | 11/1999 |
| JP | 2000138818 | 5/2000 |
| JP | 2001118331 | 4/2001 |
| JP | 2001275115 | 10/2001 |
| WO | WO9833325 | 7/1998 |
| WO | WO9945707 | 9/1999 |
| WO | WO0039954 | 7/2000 |
| WO | WO0064157 | 10/2000 |
| WO | WO0139121 | 5/2001 |

OTHER PUBLICATIONS

Paulo S.L.M. Barreto et al, "Pitfalls in Public Key Watermarking", Brazilian Symposium on Computer Graphics and Image Processing, XX, XX, Oct. 1999, pp. 241-242.

* cited by examiner

*Primary Examiner* — Kambiz Zand
*Assistant Examiner* — Dant Shaifer Harriman
(74) *Attorney, Agent, or Firm* — Larry Liberchuk

(57) ABSTRACT

This invention relates to a method and an arrangement for embedding a watermark pattern in an information signal. A method of embedding a watermark pattern in an information signal comprising the steps of determining a robust signature as a set of robust features in said information signal, creating a watermark pattern as a signature dependent function of a predefined basic watermark pattern and embedding said watermark pattern in said information signal. The invention also relates to a corresponding method and arrangement for detecting a watermark pattern in an information signal.

16 Claims, 1 Drawing Sheet

INCREASING INTEGRITY OF WATERMARKS USING ROBUST FEATURES

The invention relates to a method and an arrangement for embedding auxiliary data, such as a watermark in an information signal, e.g. a video signal, an audio signal, or more generally, multimedia content. The invention also relates to a method and arrangement for detecting said watermark pattern and a device for recording and/or playing back an information signal.

The auxiliary data may e.g. be a digital watermark, which preferably (but not necessarily) is an imperceptible label that is embedded/added to an information/host signal e.g. comprising multimedia content, video, audio, etc. The label may contain for instance copyright information, the name of the owner of the material, rights for a user etc. The amount of information that may be stored in or derived on the basis of a watermark is usually referred to as a payload and is expressed in bits.

In most watermark schemes the watermark is a pseudo-random noise sequence (pn-sequence), which is added to a host signal/information signal in either the time, spatial or a transformed domain (e.g. Fourier, Discrete Cosine or Wavelet Domain). Watermark detection is then usually based on a correlation between the watermark and the embedded host signal. In this case we have a 1 bit payload for the watermark, i.e. the noise sequence is either present or it is not present.

A recognized problem in the security of watermarking is the so-called copy attack. This attack estimates a watermark from an embedded host signal and subsequently the estimated watermark can be transplanted in a second signal. If the second signal was originally unmarked then a signal is generated which in terms of watermarking assumes identity of the embedded host signal. Further if the second signal was already marked with a watermark then the newly created signal might confuse watermark detectors.

In order to avoid the copy-attack one option is to make the watermark dependent on the content of the host signal. This is done by extracting a robust signature (a set of robust features) from the content of the host signal and the watermark is made dependent on this signature. A robust signature is a set of variables that is representative of the essentials of the host signal. If e.g. the host signal is a video signal, then ideally a slight change in the image represented by the video signal leads to no change in the signature, whereas a complete different image results in a radically different signature.

A known method of accomplishing a coupling between signature and watermark is by letting the watermark pattern depend on the signature. This is done by using a function $f(\bullet)$, from which the watermark pattern results, when the signature is inserted. This can also be described as $W=f(S)$, where W is the watermark pattern and S is the signature bitstring. The function $f(S)$ could e.g. be a random number generator generating the watermark, where the signature S is used as the seed of the generator. Alternatively a number of fixed basic patterns $W_i$ could be available and W is determined according to the following $$W=\Sigma_i b_i W_i$$

where $b_i$ are the signature bits.

Yet another possibility is to select the watermark pattern W from a set pre-generated of watermark patterns, where the selection is based on the signature S. This is described in patent application WO 01/39121.

The above methods lead to detection problems when the signature changes very quickly such as a "flashy" video clip. In known watermarking systems, the watermark is embedded in frames of the host signal. When detecting the watermark in the host signal, all the frames in a time period of e.g. 2 seconds are accumulated in a buffer. Thereby the watermarks in each frame add up coherently, improving the signal to noise ratio for the watermark detection. After the accumulation step the buffer is correlated with the watermark pattern, and the result is compared to a threshold. If the signature changes too quickly as described in the above method, then the watermark pattern changes very quickly and therefore there is little possibility of accumulation, resulting in the watermark detection being both very complex and unreliable.

It is an object of the invention to provide a method and arrangement for embedding additional/auxiliary data in an information signal where the method and arrangement solves the above-mentioned problems.

This is achieved by a method (and corresponding arrangement) of embedding a watermark pattern (W) in an information signal (X) comprising the steps of: determining a robust signature (S) as a set of robust features of said information signal (X), generating a watermark pattern (W) on the basis of a first signature dependent function ($f_S(\bullet)$) applied to a pre-defined basic watermark pattern (V), embedding said watermark pattern (W) in said information signal (X) resulting in a watermarked signal (Y), where there exist a relationship of said first signature dependent function ($f_S(\bullet)$) and a second signature dependent function ($g_S(\bullet)$) given by that a given detection operation (D) on said watermarked signal (Y) and said first function ($f_S(\bullet)$), applied to said basic watermark pattern (V), i.e. $D(Y;f_S(V))$, corresponds to said detection operation (D) on said second function ($g_S(\bullet)$), applied to said watermarked signal (Y), and said basic watermark (V), i.e. $D(g_S(Y);V)$.

The corresponding method (and corresponding arrangement) of detecting a basic watermark pattern (V) in an information signal (Y) with an embedded watermark pattern (W), said method comprising the steps of: determining a robust signature (S) as a set of robust features in said information signal (Y), generating a signal (Z) on the basis of a second signature dependent function ($g_S(\bullet)$) of said information signal (Y), detecting said basic watermark pattern (V) from said signal (Z), where there exist a relationship of said second signature dependent function ($g_S(\bullet)$) and a first signature dependent function ($f_S(\bullet)$) given by that a given detection operation (D) on said information signal (Y) and said first function ($f_S(\bullet)$), applied to said basic watermark pattern (V), i.e. $D(Y;f_S(V))$, corresponds to said detection operation (D) on said second function ($g_S(\bullet)$), applied to said information signal (Y), and said basic watermark (V), i.e. $D(g_S(Y);V)$.

Preferred embodiments of the invention are defined in the sub claims.

Hereby, the information in the watermark depends on the information signal and the watermark can only be detected in combination with information from the information signal. Thereby it is not possible to copy the watermark and use it on another information signal with different information.

For the sake of convenience the invention will be described as a system for embedding/attaching labels, preferably invisible to the human eye, to video content but the teachings can obviously be applied to any other contents including audio and muitimedia. Additionally, an embodiment for detecting one label is also described.

Figure 1:
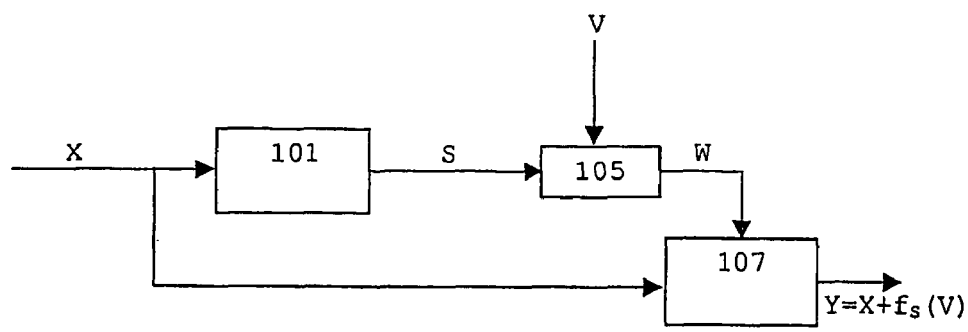
FIG. 1 shows an embodiment of an embedding arrangement according to the present invention.

FIG. 1 shows an embodiment of an embedding arrangement according to the present invention. A source provides an information signal X to be embedded with auxiliary information/a watermark. The source may e.g. provide an image, an audio signal, a signal with multimedia content, etc. As an example used in the following the information signal X is a time dependent signal, such as a DVD video signal. Also shown is embedding means (107), which adds a watermark W to the information signal/image X.

The watermark W is generated by first extracting a robust signature from the information signal X, this robust signature is a set of robust features extracted from the content of the information signal X. The extraction is performed using signature extraction means (101) and the output of the signature extraction means (101) is a signature S.

The signature S is used as input to the watermark generating means (105) together with a fixed basic pattern also called the basic watermark pattern V. The watermark generating means (105) determine a watermark pattern W as a signature dependent, invertible linear function $f_s(\bullet)$ of the basic watermark pattern V.

$$W = f_s(V).$$

The watermark pattern W is embedded in the information signal X by the embedding means (107) and an information signal Y is generated comprising the watermark pattern W.

$$Y = X + W = X + f_s(V).$$

Alternatively, the watermark pattern that is embedded in the information signal X is a tiled watermark pattern of the watermark pattern W.

In a specific embodiment, the function $f_s(\bullet)$ is a permutation function, i.e. it generates an output where the order of the bits of the input is changed, shuffled, etc. Permutation/calculation means (105) performs a permutation of the basic pattern dependent on the signature S. In this particular case, the basic watermark pattern V and the watermark W is defined as $$V = \{v_K\}, K = 1 \ldots N,$$

$$W = \{w_L\}, L = 1 \ldots N, \text{ where}$$

an invertible and signature dependent function $\phi_S$ is defined, and the watermark signal W is determined according to the following $$w_i = v_j, \text{ where } j = \phi_S(i).$$

In another embodiment, a positive integer $q_s$ being coprime to N is defined for each value of the signature S, and the watermark signal W is determined according to the following $$w_i = v_j, \text{ where } j = q_s * i \bmod N$$

In yet another embodiment, the function $f_s(\bullet)$, being dependent of the signature S, changes the signs of the basic watermark pattern V. A signature dependent pattern $P_S$ could be generated having the same size as the basic watermark pattern V, with each entry of $P_S$ being equal to +1 or −1 depending on a specific signature. In this way, the function dependent of the signature $f_s(\bullet)$ may be defined according to $$W = f_s(V) = P_S * V$$

i.e., $$w_i = (P_S)_i v_i, \text{ where } (P_S)_i = 1 \text{ or } (P_S)_i = 1$$

Figure 2:
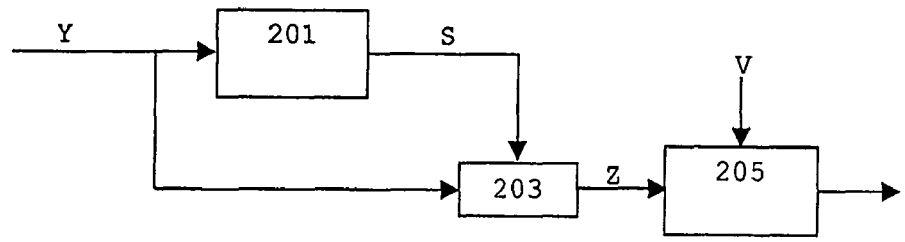
FIG. 2 illustrates a schematic diagram of a detector according to the present invention.

FIG. 2 illustrates a schematic diagram of a detector according to the present invention. Shown is an information/host signal Y, which possibly contains a watermark to be detected.

A signature S is extracted from the information signal Y. The extraction is performed using signature extraction means (201) and the output of the signature extraction means (201) is a signature S.

The signature S is used to generate an inverse signature dependent function $f_S^{-1}$ and a signal Z is generated by (203) using the watermarked signal Y as input to the inverse signature dependent function $f_S^{-1}(\bullet)$, $$Z = f_S^{-1}(Y)$$

Thereby a signal Z is obtained and by correlating the basic watermark pattern V with Z it is possible to detect whether the basic watermark pattern is present in the signal Z. Since $Y = X + f_s(V)$, $$Z = f_S^{-1}(Y) = f_S^{-1}(X + f_S^{-1}(V)) = f_S^{-1}(X) + V$$

The detection is performed by the watermark detection means (205), which has the signal Z and the basic watermark pattern V as input.

In more general terms it is possible to regenerate the basic watermark pattern because of the following:

There is an embedding operator E and a detection operator D.

$$Y = E(X, W)$$

$R = D(Y, W)$, where $R$ denotes the detection result

The function $f_S(\bullet)$ should be such that there exists another function $g_S(\bullet)$ such that $D(Y, f_S(V)) = D(g_S(Y), V)$. In the case of additive embedding this leads to the necessary property that $f_S$ is linear and $g_S = f_S^{-1}$ (and hence the necessary property that f is invertible).

Figure 3:
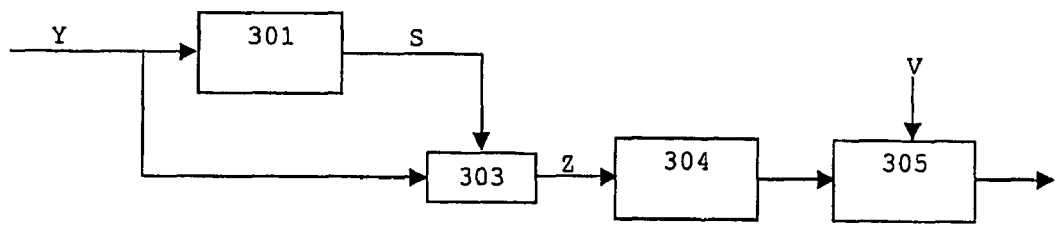
FIG. 3 illustrates an alternative embodiment of a detector according to the present invention.

A further advantageously embodiment is shown in FIG. 3 where the watermark detection is done for groups of frames/samples. By accumulating using accumulating means (304) a number of frames the statistics of detection is improved and therefore also the reliability of detection, which is especially advantageous since the value of correlation values for a present watermark is less since only a part of the noise signal/watermark actually is embedded. Here Z is added to the accumulation buffer/means (304). V does not depend on the signature, so the watermark patterns V add up coherently in the accumulation buffer thereby avoiding the problem of accumulating signature dependent material.

Figure 4:
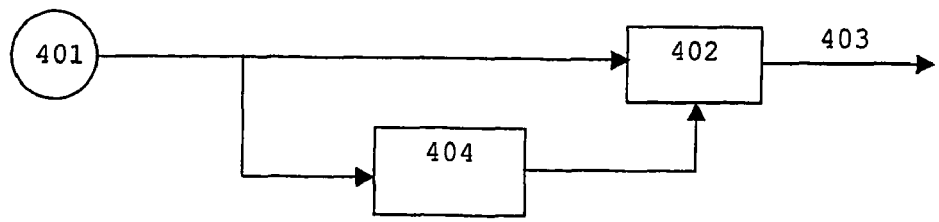
FIG. 4 shows a device for recording and/or playing back an information multi-media bit stream with an embedded watermark.

The embedded information may identify, for example, the copy-right holder, a description of the content and/or rights associated with the use of the content. In DVD copy-protection it would allow material to be labeled as 'copy once', 'never copy', 'copy no more', etc. FIG. 4 shows a device, e.g. a DVD player, for recording and/or playing back an MPEG encoded bit stream with an embedded watermark. The bit stream is recorded/stored on a information medium like a DVD disc 401. The recorded signal is applied to an output terminal 403 via a switch 402. The output terminal 403 is connected to an external MPEG decoder and display device (not shown). It is assumed that the DVD player may not play back video signals with a predetermined embedded watermark, unless other conditions are fulfilled which are not relevant to the present invention. For example, watermarked signals may only be played back if the medium 401 includes a so-called "wobble" key. In order to detect the watermark, the DVD player comprises a watermark detector 404 as described above. The detector receives the recorded signal and controls the switch 403 in response to whether or not the watermark is detected and/or what the value of the auxiliary data/the payload signifies.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word 'comprising' does not exclude the presence of other elements or steps than those listed in a claim. The invention can be implemented by means of hardware comprising several distinct elements, and by means of a suitably programmed computer. In a device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of embedding a watermark pattern (W) in an information signal (X) comprising:
   determining a robust signature (S) as a set of robust features of said information signal (X),
   generating a watermark pattern (W) on the basis of a first signature dependent function ($f_S(\bullet)$) applied to a predefined basic watermark pattern (V),
   embedding said watermark pattern (W) in said information signal (X) resulting in a watermarked signal (Y), wherein a relationship between said first signature dependent function ($f_S(\bullet)$) and a second signature dependent function ($g_S(\bullet)$) is given by $D(Y;f_S(V))=D(g_S(Y);V)$, where (D) is a given detection operation on said watermarked signal (Y), wherein said watermark pattern (W) is defined as $W=\{w_L\}, L=1 \ldots N$, said basic watermark pattern (V) is defined as $V=\{v_K\}, K=1 \ldots N$, and wherein the watermark pattern W is determined according to the following $w_i=v_j$, where $j=\phi_S(i)$, where $\phi_S$ an invertible signature dependent function.

2. The method according to claim 1 wherein said first function ($f_S(\bullet)$) is an invertible and linear function, and said second function ($g_S(\bullet)$) is an inverse function of said signature dependent function ($f_S(\bullet)$), where $g_S=f_S^{-1}$.

3. The method according to claim 1 wherein said first function $f_S(\bullet)$ is a permutation function, defined as a function that rearranges/reorders at least a part of an input bit string resulting in an rearranged output bit string.

4. The method according to claim 1, wherein said invertible, signature dependent function $\phi_S$ is defined according to $j=\phi_S(i)=q_S*i \bmod N$, where $q_S$ is a positive integer and coprime to N, and where $q_S$ is defined for each of said robust signatures (S).

5. The method according to claim 1 wherein said watermark pattern (W) is obtained from the basic watermark pattern (V) by modifying the signs of the basic pattern (V) according to the following:

$W=P_S*V$, where $P_S$ is a signature dependent pattern having the same size as the basic watermark pattern (V), with each entry of $P_S$ being equal to either +1 or −1.

6. A method for detecting a basic watermark pattern (V) in an information signal (Y) with an embedded watermark pattern (W), said method comprising:
   determining a robust signature (S) as a set of robust features in said information signal (Y),
   generating a signal (Z) on the basis of a second signature dependent function ($g_S(\bullet)$) of said information signal (Y),
   detecting said basic watermark pattern (V) from said signal (Z), wherein a relationship between said second signature dependent function ($g_S(\bullet)$) and a first signature dependent function ($f_S(\bullet)$) is given by $D(Y;f_S(V))=D(g_S(Y);V)$, where (D) is a given detection operation on said information signal (Y),
   storing the signal (Z) in an accumulation buffer, wherein said basic watermark (V) is detected by correlating the information in the accumulation buffer with said basic watermark pattern (V) where $V=\{v_K\}, K=1 \ldots N$.

7. The method according to claim 6, wherein said first signature dependent function ($f_S(\bullet)$) is an invertible and linear function, and said second signature dependent function ($g_S(\bullet)$) is an inverse function of said first function ($f_S(\bullet)$), where $g_S=f_S^{-1}$.

8. The method according to claim 6 wherein said first function $f_S(\bullet)$ is a permutation function, defined as a function that rearranges at least a part of an input bit string resulting in an rearranged output bit string, and wherein
   the embedded watermark pattern (W) has been generated during embedding as a predefined signature dependent permutation by applying said first function $f_S(\bullet)$ to said basic watermark pattern (V),
   where the signal (Z) is generated by undoing said predefined permutation on the information signal (Y).

9. The method according to claim 6, wherein said watermark pattern (W) is defined as $W=\{w_L\}, L=1 \ldots N$, said basic watermark pattern is defined as $V=\{v_K\}, K=1 \ldots N$, and wherein the watermark pattern W is determined according to the following $w_i=v_j$, where $j=\phi_S(i)$, where $\phi_S$ is an invertible signature dependent function.

10. The method according to claim 9 wherein said invertible, signature dependent function $\phi_S$ is defined according to $j=\phi_S(i)=q_s*i \bmod N$, where $q_s$ is a positive integer and coprime to N, and where $q_s$ is defined for each of said robust signatures (S).

11. The method according to claim 6, wherein
    the embedded watermark pattern (W) has been generated during embedding from the basic watermark pattern (V) by modifying the signs of the basic pattern (V) according to the following:

$W=P_S*V$, where $P_S$ is a signature dependent pattern having the same size as the basic watermark pattern (V), with each entry of $P_S$ being equal to either +1 or −1, and
    where the signal (Z) is generated by undoing said modifying of the signs on the information signal (Y).

12. An arrangement for embedding a watermark pattern (W) in an information signal (X) comprising:
    means for determining a robust signature (S) as a set of robust features in said information signal (X), means for generating a watermark pattern (W) on the basis of a first signature dependent function ($f_S(\bullet)$) applied to a predefined basic watermark pattern (V), means for embedding said watermark pattern (W) in said information signal (X) resulting in a watermarked signal (Y), where a relationship between said first signature dependent function ($f_S(\bullet)$) and a second signature dependent function ($g_S(\bullet)$) is given by $D(Y;f_S(V))=D(g_S(Y);V)$, where (D) is a given detection operation on said watermarked signal (Y), wherein said watermark pattern (W) is defined as $W=\{w_L\}, L=1\ldots N,$ said basic watermark pattern (V) is defined as $V=\{v_K\}, K=1\ldots N,$ and wherein the watermark pattern W is determined according to the following $w_i=v_j$, where $j=\phi_S(i)$, where $\phi_S$ is an invertible signature dependent function.

13. An arrangement for detecting a basic watermark pattern (V) in an information signal (Y) with an embedded watermark pattern (W), said arrangement comprising:

means for determining a robust signature (S) as a set of robust features in said information signal (Y), means for generating a signal (Z) on the basis of a second signature dependent function ($g_S(\bullet)$) of said information signal (Y), means for detecting said basic watermark pattern (V) from said signal (Z), where a relationship between said second signature dependent function ($g_S(\bullet)$) and a first signature dependent function ($f_S(\bullet)$) is given by $D(Y;f_S(V))=D(g_S(Y);V)$, where (D) is a given detection operation on said information signal (Y), wherein the signal (Z) is stored in an accumulation buffer, and wherein said basic watermark (V) is detected by correlating the information in the accumulation buffer with said basic watermark pattern (V) where $V=K=1\ldots N$.

14. A device for recording and/or playing back an information signal, the device comprising means for disabling recording and/or playback of the information signal in dependence upon a basic watermark pattern (V) embedded in said information signal (Y) wherein the device further comprises an arrangement for detecting said basic watermark pattern (V) according to claim 13.

15. A device for transmitting an information signal, the device comprising an arrangement for embedding a watermark pattern (W) in an information signal (X) comprising:

means for determining a robust signature (S) as a set of robust features in said information signal (X), means for generating a watermark pattern (W) on the basis of a first signature dependent function ($f_S(\bullet)$) applied to a predefined basic watermark pattern (V), means for embedding said watermark pattern (W) in said information signal (X) resulting in a watermarked signal (Y), where a relationship between said first signature dependent function ($f_S(\bullet)$) and a second signature dependent function ($g_S(\bullet)$) is given by $D(Y;f_S(V))=D(g_S(Y);V)$, where (D) is a given detection operation on said watermarked signal (Y), wherein said watermark pattern (W) is defined as $W=\{w_L\}, L=1\ldots N,$ said basic watermark pattern (V) is defined as $V=\{v_K\}, K=1\ldots N,$ and wherein the watermark pattern W is determined according to the following $w_i=v_j$, where $j=\phi_S(i)$, where $\phi_S$ an invertible signature dependent function.

16. A storage medium having stored thereon an information signal (Y) with an embedded watermark pattern (W), said watermark pattern (W) being generated on the basis of a first signature dependent function ($f_S(\bullet)$) applied to a predefined basic watermark pattern (V), said function ($f_S(\bullet)$) depends on a robust signature (S) of said information signal (Y), where a relationship between said first signature dependent function ($f_S(\bullet)$) and a second signature dependent function ($g_S(\bullet)$) is given by $D(Y;f_S(V))=D(g_S(Y);V)$, where (D) is a given detection operation on said information signal (Y), wherein said watermark pattern (W) is defined as $W=\{w_L\}, L=1\ldots N,$ said basic watermark pattern (V) is defined as $V=\{v_K\}, K=1\ldots N,$ and wherein the watermark pattern W is determined according to the following $w_i=v_j$, where $j=\phi_S(i)$, where $\phi_S$ is an invertible signature dependent function.

* * * * *